United States Patent
Lynch et al.

(10) Patent No.: US 12,308,878 B2
(45) Date of Patent: May 20, 2025

(54) MULTI-MODAL MONITORING OF LINKS BETWEEN MULTIPLE POINTS

(71) Applicant: INTERNATIONAL BUSINESS MACHINES CORPORATION, Armonk, NY (US)

(72) Inventors: Robert Lynch, Bedminster, NJ (US); Hyman David Chantz, Scarsdale, NY (US); Elijah Swift, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 181 days.

(21) Appl. No.: 18/191,429

(22) Filed: Mar. 28, 2023

(65) Prior Publication Data
US 2024/0333384 A1 Oct. 3, 2024

(51) Int. Cl.
*H04B 10/079* (2013.01)

(52) U.S. Cl.
CPC ............... *H04B 10/07955* (2013.01)

(58) Field of Classification Search
CPC .................................. H04B 10/07955
USPC ............................................... 398/17
See application file for complete search history.

(56) References Cited

U.S. PATENT DOCUMENTS

| | | | |
|---|---|---|---|
| 5,194,847 A | 3/1993 | Taylor et al. | |
| 9,178,755 B2 * | 11/2015 | Dahlfort | H04L 41/0677 |
| 10,038,494 B1 | 7/2018 | Paraschis et al. | |
| 10,542,336 B2 | 1/2020 | Paraschis et al. | |
| 10,581,530 B2 | 3/2020 | Campos et al. | |
| 11,323,312 B1 * | 5/2022 | Banka | H04L 43/10 |
| 11,418,407 B2 | 8/2022 | Ewert et al. | |
| 2011/0158105 A1 * | 6/2011 | Duffield | H04L 43/16 370/242 |
| 2018/0322283 A1 * | 11/2018 | Puri | G06F 16/254 |
| 2019/0068467 A1 * | 2/2019 | Chauhan | G06F 11/3452 |
| 2024/0162981 A1 * | 5/2024 | Kim | H04B 10/07955 |

OTHER PUBLICATIONS

Viavi Solutions, Inc., "Fiber-Tapping Detection with the ONMSI Optical Network Monitoring System," 2021 (no further date information available), 2 pages.

ldatech.com, "Measure Latencies with 31 Picosecond Accuracy: Detect the Difference of 7 MM of Fiber," https://ldtech.com/Technologies/TOF, downloaded from internet Feb. 2, 2023, 2 pages.

(Continued)

*Primary Examiner* — Dalzid E Singh
(74) *Attorney, Agent, or Firm* — Tihon Poltavets, Esq.; Blanche E. Schiller, Esq.; Heslin Rothenberg Farley & Mesiti P.C.

(57) ABSTRACT

Links between multiple points are monitored. A determination is made that there is a change in power on a link being monitored. Based on determining that there is the change in the power on the link, latency on the link is checked and an anomaly on the link is detected. Based on detecting that there is the anomaly on the link, a determination is made of a type of the anomaly based on whether the checking indicates there is a latency change in the latency of the link.

20 Claims, 4 Drawing Sheets

(56) References Cited

OTHER PUBLICATIONS

Anonymous, "Method and Apparatus for Security Information and Event Management System Health Visualization," IP.com No. IPCOM000255398D, Sep. 24, 2018, 4 pages (+ cover).

Anonymous, "Persona Identification Through Social Multi-Network Analysis," IP.com No. IPCOM000262812D, Jul. 1, 2020, 4 pages (+ cover).

Anonymous, "Link Security Based on Fiber Infrastructure Tampering," IP.com No. IPCOM000269851D, May 17, 2022, 4 pages (+ cover).

Anonymous, "A System and Method for Finding Best Accommodation Using Deep Asthetic Features in Multimodal Data from Social Networks," IP.com No. IPCOM000257913D, Mar. 23, 2019, 6 pages (+ cover).

\* cited by examiner

MULTI-MODAL MONITORING OF LINKS BETWEEN MULTIPLE POINTS

BACKGROUND

One or more aspects relate, in general, to data/signal transmission, and in particular, to monitoring links used to transmit data/signals between multiple points.

Links, such as fiber links or fiber optic links, are widely used for data/signal transmission between multiple points, such as endpoints or devices. These links carry data in the form of signals from one point to another point. The data may be confidential, and as such, it is to be protected.

Links that go off-premises may be considered under the control of another entity. Thus, the links may be vulnerable to security breaches, allowing another entity to obtain confidential or other data not authorized for the other entity.

Therefore, there exists a need to monitor links that transmit data/signals between multiple points. Security and reliability of the links used to carry data/signals between multiple points are to be monitored and protected.

SUMMARY

Shortcomings of the prior art are overcome, and additional advantages are provided through the provision of a computer-implemented method of monitoring links between multiple points. A determination is made that there is a change in power on a link being monitored. Based on determining that there is the change in the power on the link, latency on the link is checked and an anomaly on the link is detected. Based on detecting that there is the anomaly on the link, a determination is made of a type of the anomaly based on whether the checking indicates there is a latency change in the latency of the link. By checking both power and latency changes on a link being monitored, different types of anomalies may be detected, and therefore, corrected. This improves reliability and security of the link.

In one aspect, based on the checking indicating that the latency is unchanged, the type of the anomaly is a failure of the link. Detection of a failure of the link (potential or actual) is facilitated, improving reliability of the link.

In one aspect, based on the checking indicating that there is the latency change, the type of the anomaly is a security vulnerability on the link. Detection of a security vulnerability on the link is facilitated, improving security and reliability of the link.

In one aspect, the determining that there is the change in the power on the link includes determining that there is a decrease in the power on the link. By monitoring power on the link, such as receive power, and determining that there is a decrease in the power, processing is facilitated by improving detection of an anomaly on the link.

In one aspect, the determining that there is the change in the power on the link includes determining that there is a decrease in optical power on the link due to light refraction. By monitoring optical power on the link, such as receive optical power, and determining that there is a decrease in the optical power, processing is facilitated by improving detection of an anomaly on the link. Security and/or reliability of the link is improved.

In one aspect, the determining the type of the anomaly includes determining the type of the anomaly based on whether there is an increase in the latency of the link. By monitoring power and latency of the link and determining that there is an increase in the latency, processing is facilitated by improving detection of a particular type of anomaly (e.g., a security vulnerability) on the link. Security and/or reliability of the link is improved.

In one aspect, the type of the anomaly is a failure of the link based on there not being the increase in the latency of the link. By monitoring power and latency of the link and determining that there is not an increase in the latency, processing is facilitated by improving detection of a particular type of anomaly (e.g., a failure) of the link. Reliability of the link is improved.

In one aspect, the type of the anomaly is a security vulnerability on the link based on there being the increase in the latency of the link. By monitoring power and latency of the link and determining that there is an increase in the latency, processing is facilitated by improving detection of a particular type of anomaly (e.g., a security vulnerability) on the link. Security and reliability of the link is improved.

In one aspect, the link is a fiber optic link, and the multiple points include one device at one end of the link and another device at another end of the device. Security and reliability of fiber optical links is improved by monitoring power and latency on the fiber optic links.

In one aspect, the power is optical power. Security and reliability of optical links is improved by monitoring optical power and latency on the links.

Computer systems and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
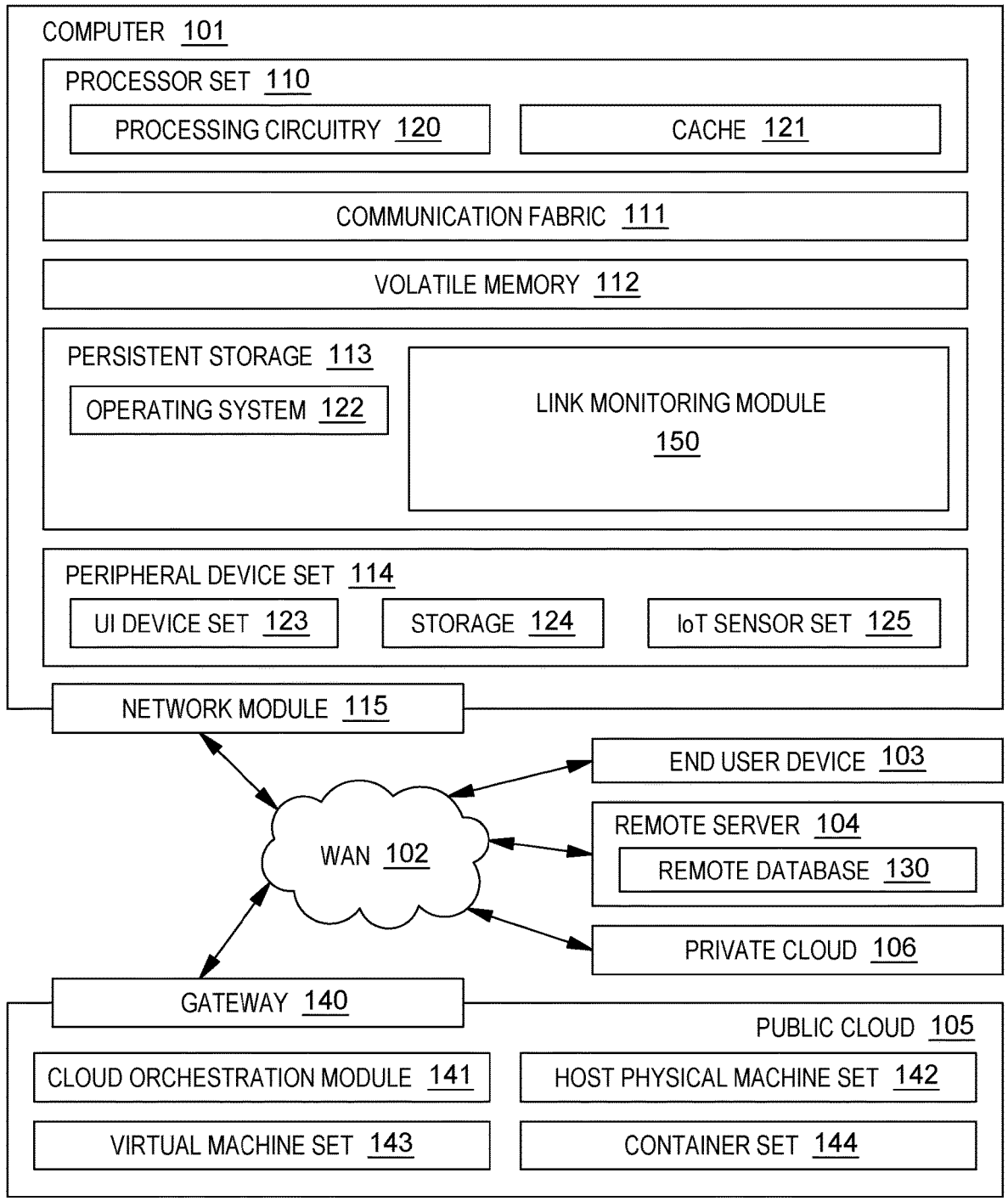
FIG. 1 depicts one example of a computing environment to incorporate and use one or more aspects of the present invention.

In accordance with one or more aspects, a capability is provided to monitor links (e.g., fiber links, fiber optic links, other types of links) between multiple (e.g., two or more) points, such as devices, endpoints, etc. In one or more aspects, the links are monitored to determine one or more anomalies on the link, such as a link failure (potential or actual) and/or a security vulnerability. In one or more aspects, the monitoring improves processing in environments that utilize such links, such as computing environments, by facilitating detection and/or correction of one or more anomalies. As examples, detection of link failures enables links to be proactively fixed and/or facilitates the correction of link problems; and detection of security vulnerabilities enhances protection of the data/signals being transmitted between the multiple points. The monitoring and detection of one or more anomalies enhances processing within the computing environment.

One or more aspects of the present invention are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) that, e.g., monitors links, and/or performs one or more other aspects of the present invention. Aspects of the present invention are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present invention is described with reference to FIG. 1. In one example, a computing environment 100 contains an example of an environment for the execution of at least some of the computer code involved in performing the inventive methods, such as link monitoring code or module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present invention. Other examples are possible. For instance, in one or more embodiments, one or more of the components/modules of FIG. 1 are not included in the computing environment and/or are not used for one or more aspects of the present invention. Further, in one or more embodiments, additional and/or other components/modules may be used. Link monitoring and/or other aspects of the present invention may be used in any type of environment that utilizes such links. The environment may include a link monitoring module and/or link monitoring processing to perform link monitoring to detect link anomalies. Other variations are possible.

In one or more aspects, a link monitoring module (e.g., link monitoring module 150) is used to monitor links to determine if there are any anomalies and if so, the type of anomalies. A link monitoring module (e.g., link monitoring module 150) includes code or instructions used to perform monitoring of links, in accordance with one or more aspects of the present invention. A link monitoring module (e.g., link monitoring module 150) includes, in one example, various sub-modules to be used to perform the processing. The sub-modules are, e.g., computer readable program code (e.g., instructions) in computer readable media, e.g., storage (storage 124, persistent storage 113, cache 121, other storage, as examples). The computer readable media may be part of a computer program product and the computer readable program code may be executed by and/or using one or more computing devices (e.g., one or more computers, such as computer(s) 101; one or more servers, such as remote server(s) 104; one or more processors or nodes, such as processor(s) or node(s) of processor set 110; processing circuitry, such as processing circuitry 120 of processor set 110; and/or other computing devices, etc.). Additional and/or other computers, servers, processors, nodes, processing circuitry and/or other computing devices may be used to execute one or more of the sub-modules and/or portions thereof. Many examples are possible.

Figure 2:
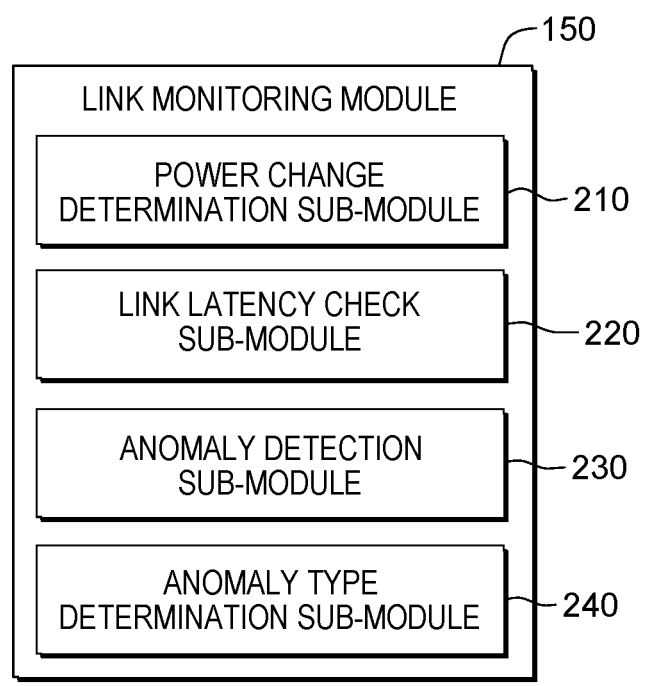
FIG. 2 depicts one example of sub-modules of a link monitoring module of FIG. 1, in accordance with one or more aspects of the present invention.

One example of link monitoring module 150 is described with reference to FIG. 2. In one example, link monitoring module 150 includes a power change determination sub-module 210 to determine whether there was a change in power (e.g., optical power) on a link being monitored; a link latency check sub-module 220 to check the latency on the link to, e.g., determine if there was a change in latency on the link being monitored; an anomaly detection sub-module 230 to determine if an anomaly on the link has been detected; and an anomaly type determination sub-module 240 to determine the type of anomaly detected, assuming an anomaly has been detected. Additional, fewer and/or other sub-modules may be provided and/or used in one or more aspects of the present invention.

The sub-modules are used, in accordance with one or more aspects of the present invention, to monitor one or more links, such as fiber links, fiber optic links and/or other types of links, as further described with reference to FIG. 3. In one example, a link monitoring process (e.g., a link monitoring process 300) is implemented using one or more of the sub-modules (e.g., sub-modules 210-240) and is executed by one or more computing devices (e.g., one or more computers (e.g., computer(s) 101, other computer(s), etc.), one or more servers (e.g., server(s) 104, other server(s), etc.), one or more processor(s), node(s) and/or processing circuitry, etc. (e.g., of processor set 110 or other processor sets), and/or other computing devices, etc.). Although example computers, servers, processors, nodes, processing circuitry and/or computing devices are provided, additional, fewer and/or other computers, servers, processors, nodes, processing circuitry and/or computing devices may be used for the link monitoring process and/or other processing. Various options are possible.

Figure 3:
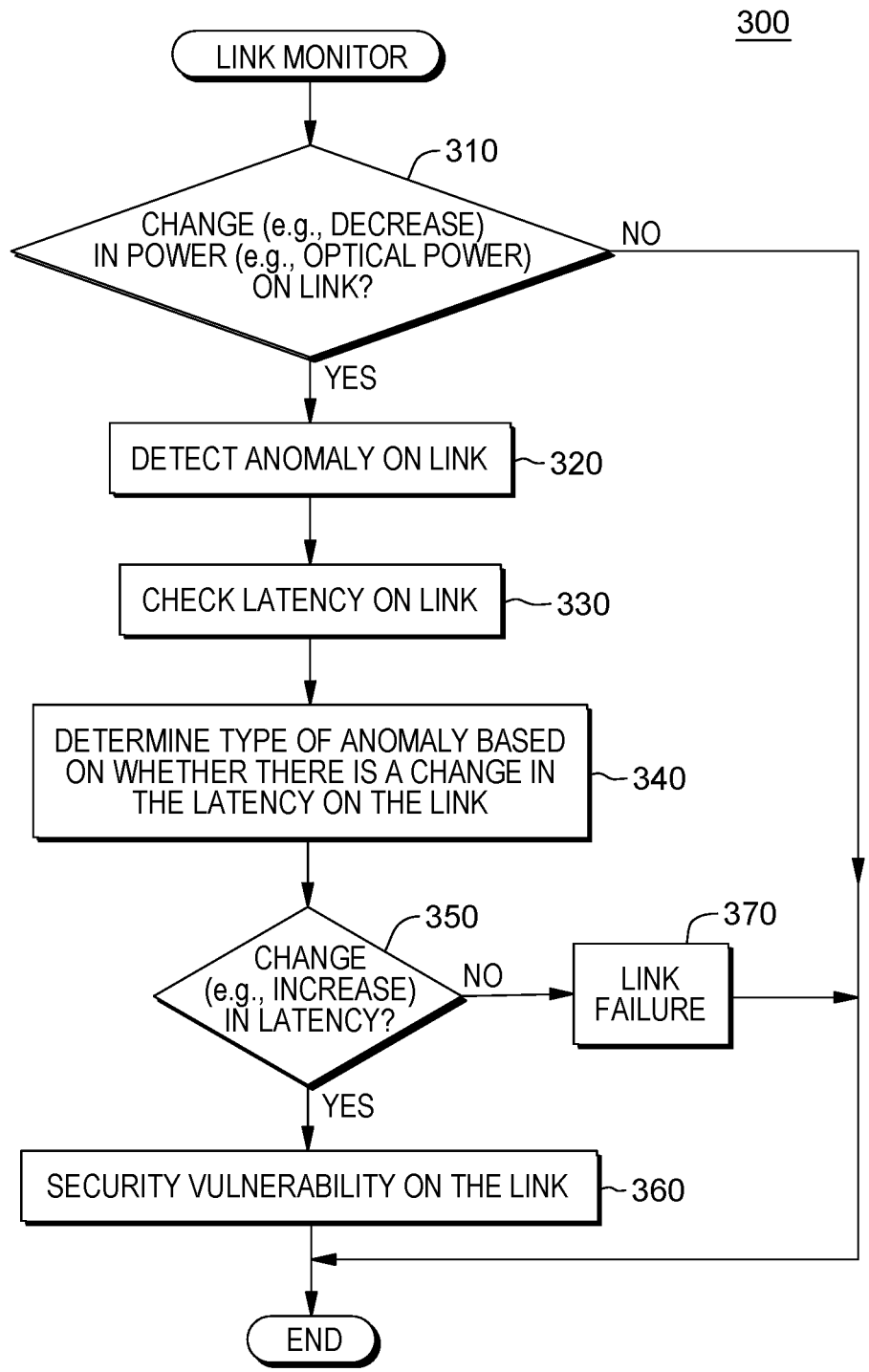
FIG. 3 depicts one example of a link monitoring process, in accordance with one or more aspects of the present invention.

Referring to FIG. 3, in one example, link monitoring process 300 (also referred to herein as process 300) determines 310 whether there is a change in power on a link being monitored. For instance, a determination is made as to whether there is a decrease in power on the link, such as, e.g., a decrease in optical power received on the link.

In one example, the link is between two devices, and each device includes, for instance, a transceiver to transmit and receive data. In one example in which the link is a fiber optic link, the transceiver is an optical transceiver that transmits and receives data in the form of light pulses. The transceiver is used to convert electrical signals to optical (light) signals and optical signals to electrical signals. In one or more aspects, one or more of the devices includes link monitoring process 300 running thereon, which monitors the input power (e.g., receive (RX) power) the device is receiving. The power is, for instance, optical power provided by lasers, which emit light in the form of optical pulses (light flashes) that may be monitored to approximately a photonic (photons) basis. A change in optic power may indicate that the link (e.g., the physical link or cable) has changed/moved. Movement in the link causes a change in bends and/or refractions, which may be frequency (color) dependent. That is, in one example, a movement in the link may cause a change in input power due to light refraction. As examples, longer or split links will have less input power.

Based on determining that there is the change in power on the link being monitored, such as a decrease in power, process 300 detects 320 that there is an anomaly on the link. Further, in accordance with one or more aspects, process 300 checks 330 the latency on the link. For instance, process 300 checks the current latency on the link and compares it to a previously determined latency (e.g., a baseline latency). By accurately determining and monitoring latency on the link, it may be determined whether a length of the link has changed, e.g., increased. A sudden unplanned change in latency coinciding with a link flap may indicate that the link has been tampered. For instance, an increase in latency may indicate that the length of fiber has increased (e.g., due to a security vulnerability, such as the addition of a network tap or other security breach, etc.). Constant lengths are to have constant latency.

Latency may be determined using a number of techniques, including, for instance, a Time of Flight (TOF) technique that can measure latencies to, e.g., 31 picoseconds of precision which maps to 7 mm of fiber cable. Another technique is Precision Time Protocol (PTP), which is a high precision clock synchronization that is used to compute latency. Other techniques may also be used. In one example, latency is probed on a fixed basis, which may be user-defined. For instance, it may be performed at specific intervals or based on a selected event. Other variations are possible.

Figure 4A:
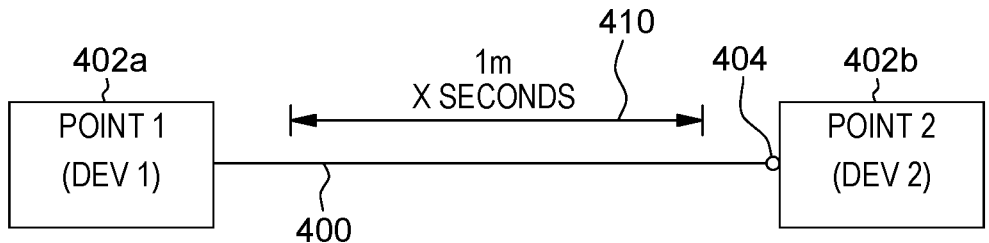
FIGS. 4A-4D depicts various links between devices, in accordance with one or more aspects of the present invention.
Figure 4B:
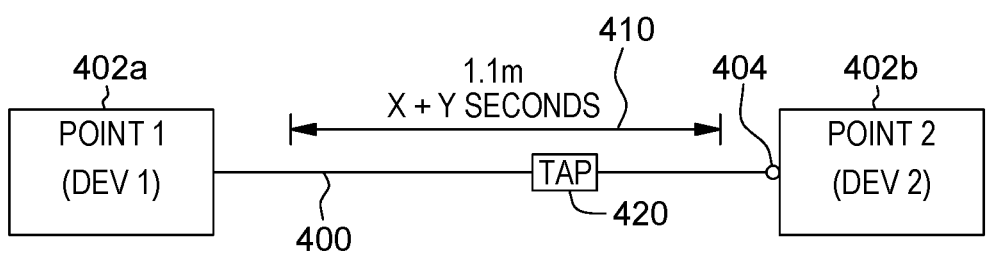

Process 300 determines 340 a type of anomaly based on, for instance, whether there is a particular change in latency of the link. For example, should process 300 determine 350 that there is an increase in latency, process 300 determines 360 that the type of anomaly is a security vulnerability on the link, such as the addition of a tap or a device on the link and/or other vulnerabilities. As shown, in one example, in FIGS. 4A-4B, assume a link 400 coupling two points 402a, 402b (e.g., device 1 and device 2) has a latency 410 of a particular value (e.g., 1 meter or x seconds, as depicted in FIG. 4A) and assume that a device (e.g., device 402b) has (e.g., as part of or coupled thereto) a receive power monitor 404 to monitor receive power of the device. In this example, it is detected (e.g., using process 300) that the receive power provided by, e.g., monitor 404 has decreased and that latency 410 has changed (e.g., increased, such as 1.1 meters or x+y seconds, as depicted in FIG. 4B), and thus, in one example, it is determined that there is a security vulnerability on the link, such as a tap 420 has been added to the link.

Figure 4C:
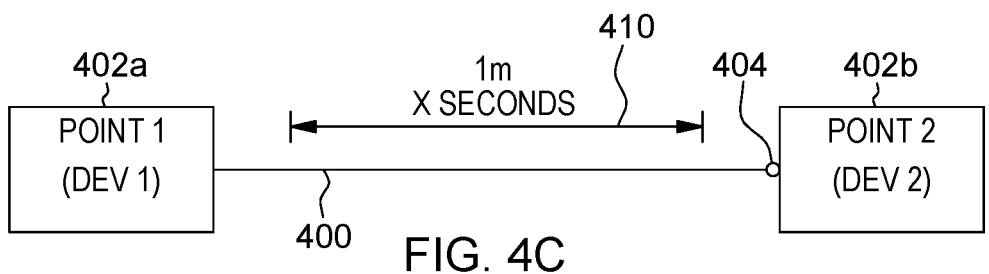
Figure 4D:
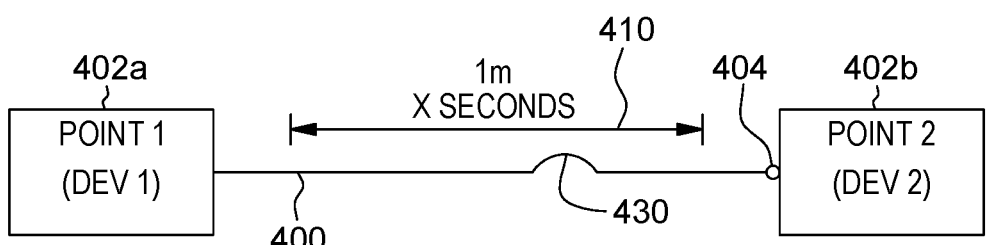

However, returning to FIG. 3, should process 300 determine 350 that the particular change in latency has not been detected (e.g., latency has not increased), process 300 determines 370 that the type of anomaly is a link failure (e.g., potential or actual). For instance, decreased power and no change in link latency (e.g., cable length) may indicate that an optic is starting to fail or has failed. As depicted in FIGS. 4C-4D, latency 410 has not changed, but there is a change in the path (shown, e.g., at 430), and thus, a change (e.g., decrease) in power, as indicated by, e.g., receive power monitor 404. Therefore, a link failure (actual or potential) is detected.

Returning to inquiry 310 (FIG. 3), in one example, based on process 300 determining that there has not been the change in power, such as a decrease in power, then process 300 does not detect an anomaly on the link. Other variations are possible.

In one example, the link continues to be monitored and process 300 checks at periodic intervals (e.g., based on notification; sensing of a change in power; at selected time periods; etc.) whether there is a change (e.g., decrease) in power on the link to suggest further processing is to be performed.

As described herein, in one or more aspects, utilizing both latency and power, anomalies on a link may be detected, including one or more of defects on the link and/or a security vulnerability (e.g., breach). Receive power in combination with increases in latency allow for fewer false positives when a user moves a cable. Receive power is used to pre-emptively determine that a transceiver may be on the verge of failing. In one example, a change in latency occurs when the physical link changes. When the physical link length is, e.g., increased, a decrease in receive power is expected. This change indicates to, e.g., a network operator or other entity, that there is an anomaly (e.g., a security vulnerability). In another example, the receive power remains constant if the path (e.g., link) is constant. If the link changes, even without changing the length of the link, variations in receive power due to refractions in the fiber are expected. This can, e.g., trigger the network operator or other entity to check for anomalies.

Further, in one example, a closed loop of control is defined. That is, in one example, in a closed loop of control, entities, such as network control operators, may detect both unauthorized network breach activity and authorized regular upgrading or maintenance on or of the network. In addition, testing of the sufficiency of network control operations can occur by authorized activity on the network—such as bending cables or inserting new equipment—which, when done on a scheduled or unscheduled basis—would exercise and validate the network observation sufficiency of the network control operators. Hence, a closed loop of control is established by both the network control operators detecting anomalies, and anomalies being inserted by authorized parties to validate the network control operators' observation sufficiency.

In one aspect, a fiber transmission integrity vector can be iteratively established. As an example, the integrity vector is arrayed from weighted timing, power, distance, phase and/or other factors, as examples. For instance, the vector is equal to the square root of (each selected factor squared and added to one another (e.g., $x^2+y^2+z^2 \ldots +n^2$)). In one example, when the least squared length or another chosen parameter is exceeded, an alert may be issued. This metric may be improved iteratively.

Thus, in one example, a multi-dimensional vector may be established for analyzing the state of the network, with for example one axis being latency, one axis being power, one axis being frequency, etc. This vector may have parameters of accepted, non-compromised, behavior, which would geometrically provide a cone or cylinder of acceptable network status. In addition, this vector—which may continually change slightly—can be recorded for further study, or displayed in real-time for continual observation and analysis. (For example, on a visual display, latency is the X axis, power is the Y axis, frequency is the color.) Other examples and/or variations are possible.

One or more aspects of the present invention are tied to computer technology and facilitate processing within a computer, improving performance thereof. For instance, link monitoring and anomaly detection on links between multiple points (e.g., endpoints, devices, etc.) are facilitated. This improves reliability and security of the links, and therefore, processing that uses the links. Processing within a processor, computer system and/or computing environment is facilitated.

In one or more aspects, links between multiple points are monitored. A determination is made that there is a change in power on a link being monitored. Based on determining that there is the change in the power on the link, latency on the link is checked and an anomaly on the link is detected. Based on detecting that there is the anomaly on the link, a determination is made of a type of the anomaly based on whether the checking indicates there is a latency change in the latency of the link. By checking both power and latency changes on a link being monitored, different types of anomalies may be detected, and therefore, corrected. This improves reliability and security of the link.

In one aspect, based on the checking indicating that the latency is unchanged, the type of the anomaly is a failure of the link. Detection of a failure of the link (potential or actual) is facilitated, improving reliability of the link.

In one aspect, based on the checking indicating that there is the latency change, the type of the anomaly is a security vulnerability on the link. Detection of a security vulnerability on the link is facilitated, improving security and reliability of the link.

In one aspect, the determining that there is the change in the power on the link comprises determining that there is a decrease in the power on the link. By monitoring power on the link, such as receive power, and determining that there is a decrease in the power, processing is facilitated by improving detection of an anomaly on the link.

In one aspect, the determining that there is the change in the power on the link comprises determining that there is a decrease in optical power on the link due to light refraction. By monitoring optical power on the link, such as receive optical power, and determining that there is a decrease in the optical power, processing is facilitated by improving detection of an anomaly on the link. Security and/or reliability of the link is improved.

In one aspect, the determining the type of the anomaly comprises determining the type of the anomaly based on whether there is an increase in the latency of the link. By monitoring power and latency of the link and determining that there is an increase in the latency, processing is facilitated by improving detection of a particular type of anomaly (e.g., a security vulnerability) on the link. Security and/or reliability of the link is improved.

In one aspect, the type of the anomaly is a failure of the link based on there not being the increase in the latency of the link. By monitoring power and latency of the link and determining that there is not an increase in the latency, processing is facilitated by improving detection of a particular type of anomaly (e.g., a failure) of the link. Reliability of the link is improved.

In one aspect, the type of the anomaly is a security vulnerability on the link based on there being the increase in the latency of the link. By monitoring power and latency of the link and determining that there is an increase in the latency, processing is facilitated by improving detection of a particular type of anomaly (e.g., a security vulnerability) on the link. Security and reliability of the link is improved.

In one aspect, the link is a fiber optic link, and the multiple points include one device at one end of the link and another device at another end of the device. Security and reliability of optical links is improved by monitoring power and latency on the fiber optic links.

In one aspect, the power is optical power. Security and reliability of optical links is improved by monitoring optical power and latency on the links.

In one or more aspects, the security and health of a link (e.g., a fiber link, a fiber optic link, other type of link) are monitored utilizing latency and optical power on the link. In one or more examples, a baseline latency for a link (e.g., a fixed fiber link) between two points (e.g., endpoints, devices, etc.) is determined. Based on, for instance, determining a decrease in optical receive power between the two points (e.g., due to light refraction) and determining that the link has potentially increased in length (e.g., due to a network tap or the addition of a device, etc.), a determination is made that the link is potentially compromised. Further, based on, for instance, determining a decrease in optical receive power between the two points and determining that the link has not increased in length, a determination is made that the link is failing. Other examples are also possible.

A determination of an anomaly on a link being monitored enables the anomaly to be addressed. For instance, a determination of a link failure (potential or actual) enables the link to be repaired or replaced. This may be performed proactively, facilitating processing within a computing environment. As a further example, determination of a security vulnerability enables further checking of an added tap or device and the removal of such and/or adding further security protections. Other possibilities exist.

Although various aspects and/or embodiments are described herein, other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

Yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, different techniques may be used to determine a change in power and/or latency. Further, various types of links may benefit from one or more aspects of the present invention. Many variations are possible.

Various aspects and embodiments are described herein. Further, many variations are possible without departing from a spirit of aspects of the present invention. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of monitoring links between multiple points, the computer-implemented method comprising:
   determining that there is a change in power on a link being monitored;
   checking, based on determining that there is the change in the power on the link, latency on the link;
   detecting that there is an anomaly on the link, based on determining that there is the change in the power on the link; and
   determining, based on detecting that there is the anomaly on the link, a type of the anomaly based on whether the checking indicates there is a latency change in the latency of the link, wherein the type of anomaly that is determined based on whether there is the latency change is from a group of anomalies including a failure of the link and a security vulnerability of the link.

2. The computer-implemented method of claim 1, wherein based on the checking indicating that the latency is unchanged, the type of the anomaly is the failure of the link.

3. The computer-implemented method of claim 1, wherein based on the checking indicating that there is the latency change, the type of the anomaly is the security vulnerability on the link.

4. The computer-implemented method of claim 1, wherein the determining that there is the change in the power on the link comprises determining that there is a decrease in the power on the link.

5. The computer-implemented method of claim 1, wherein the determining that there is the change in the power on the link comprises determining that there is a decrease in optical power on the link due to light refraction.

6. The computer-implemented method of claim 1, wherein the determining the type of the anomaly comprises determining the type of the anomaly based on whether there is an increase in the latency of the link.

7. The computer-implemented method of claim 6, wherein the type of the anomaly is the failure of the link based on there not being the increase in the latency of the link.

8. The computer-implemented method of claim 6, wherein the type of the anomaly is the security vulnerability on the link based on there being the increase in the latency of the link.

9. The computer-implemented method of claim 1, wherein the link is a fiber optic link, and the multiple points include one device at one end of the link and another device at another end of the device.

10. The computer-implemented method of claim 1, wherein the power is optical power.

11. A computer system for facilitating processing within a computing environment, the computer system comprising:
    a memory; and
    a computing device in communication with the memory, wherein the computer system is configured to perform a method, said method comprising:
       determining that there is a change in power on a link being monitored;
       checking, based on determining that there is the change in the power on the link, latency on the link;
       detecting that there is an anomaly on the link, based on determining that there is the change in the power on the link; and
       determining, based on detecting that there is the anomaly on the link, a type of the anomaly based on whether the checking indicates there is a latency change in the latency of the link, wherein the type of anomaly that is determined based on whether there is the latency change is from a group of anomalies including a failure of the link and a security vulnerability of the link.

12. The computer system of claim 11, wherein based on the checking indicating that the latency is unchanged, the type of the anomaly is the failure of the link.

13. The computer system of claim 11, wherein based on the checking indicating that there is the latency change, the type of the anomaly is the security vulnerability on the link.

14. The computer system of claim 11, wherein the determining that there is the change in the power on the link comprises determining that there is a decrease in the power on the link.

15. The computer system of claim 11, wherein the determining the type of the anomaly comprises determining the type of the anomaly based on whether there is an increase in the latency of the link.

16. A computer program product for facilitating processing within a computing environment, the computer program product comprising:
    one or more computer readable storage media and program instructions collectively stored on the one or more computer readable storage media to perform a method comprising:
        determining that there is a change in power on a link being monitored;
        checking, based on determining that there is the change in the power on the link, latency on the link;
        detecting that there is an anomaly on the link, based on determining that there is the change in the power on the link; and
        determining, based on detecting that there is the anomaly on the link, a type of the anomaly based on whether the checking indicates there is a latency change in the latency of the link, wherein the type of anomaly that is determined based on whether there is the latency change is from a group of anomalies including a failure of the link and a security vulnerability of the link.

17. The computer program product of claim 16, wherein based on the checking indicating that the latency is unchanged, the type of the anomaly is the failure of the link.

18. The computer program product of claim 16, wherein based on the checking indicating that there is the latency change, the type of the anomaly is the security vulnerability on the link.

19. The computer program product of claim 16, wherein the determining that there is the change in the power on the link comprises determining that there is a decrease in the power on the link.

20. The computer program product of claim 16, wherein the determining the type of the anomaly comprises determining the type of the anomaly based on whether there is an increase in the latency of the link.

* * * * *